United States Patent [19]
Kummer

[11] 3,772,696
[45] Nov. 13, 1973

[54] SPEED GATE EQUIPPED DOPPLER RADAR SYSTEM
[75] Inventor: Helmut Kummer, Munich-Waldperlach, Germany
[73] Assignee: Telefunken Patentverwertungs-G.M.b.H., Ulm/Donau, Germany
[22] Filed: Apr. 18, 1962
[21] Appl. No.: 189,244

[30] Foreign Application Priority Data
Apr. 18, 1961 Germany.............................. T 20,001

[52] U.S. Cl.............................. 343/7.4, 343/8, 343/9
[51] Int. Cl............................................... G01s 9/44
[58] Field of Search........................ 343/7.3, 7.4, 8, 343/9, 7.7

[56] References Cited
UNITED STATES PATENTS
| | | | |
|---|---|---|---|
| 2,945,212 | 7/1960 | Shekels et al. | 332/17 |
| 2,994,865 | 8/1961 | Scism et al. | 343/7.4 |
| 3,031,659 | 4/1962 | LeParquier | 343/7.7 |
| 3,056,128 | 9/1962 | Ball et al. | 343/8 |
| 3,086,201 | 4/1963 | Smith et al. | 343/8 |
| 3,090,950 | 5/1963 | Flower | 43/8 |

Primary Examiner—T. H. Tubbesing
Attorney—Spencer and Kaye

EXEMPLARY CLAIM

2. In a Doppler radar system, the combination which comprises:
   a. search antenna means;
   b. reference generator means coupled to said search antenna means;
   c. signal processing means electrically connected to said search antenna means and including
      1. a Doppler frequency detector, and
      2. a speed gate incorporating,
         i. a two-input mixer one of whose inputs is connected to the output of said Doppler frequency detector,
         ii. at least first and second band pass filters each having a narrow pass band, the input of said first filter being connected to the output of said mixer, and
         iii. mixer control means connected to the output of said first filter and to the other of the inputs of said mixer for causing the latter to deliver a substantially constant carrier frequency;
   d. modulating means connected to the output of said reference generator means and to the output of said mixer, the output of said modulating means being connected to the input of said second filter of said speed gate; and
   e. means connecting the output of said second filter to said search antenna means for controlling the position thereof.

12 Claims, 7 Drawing Figures

INVENTOR
Helmut Kummer

BY George H Spencer

ATTORNEY

INVENTOR
Helmut Kummer

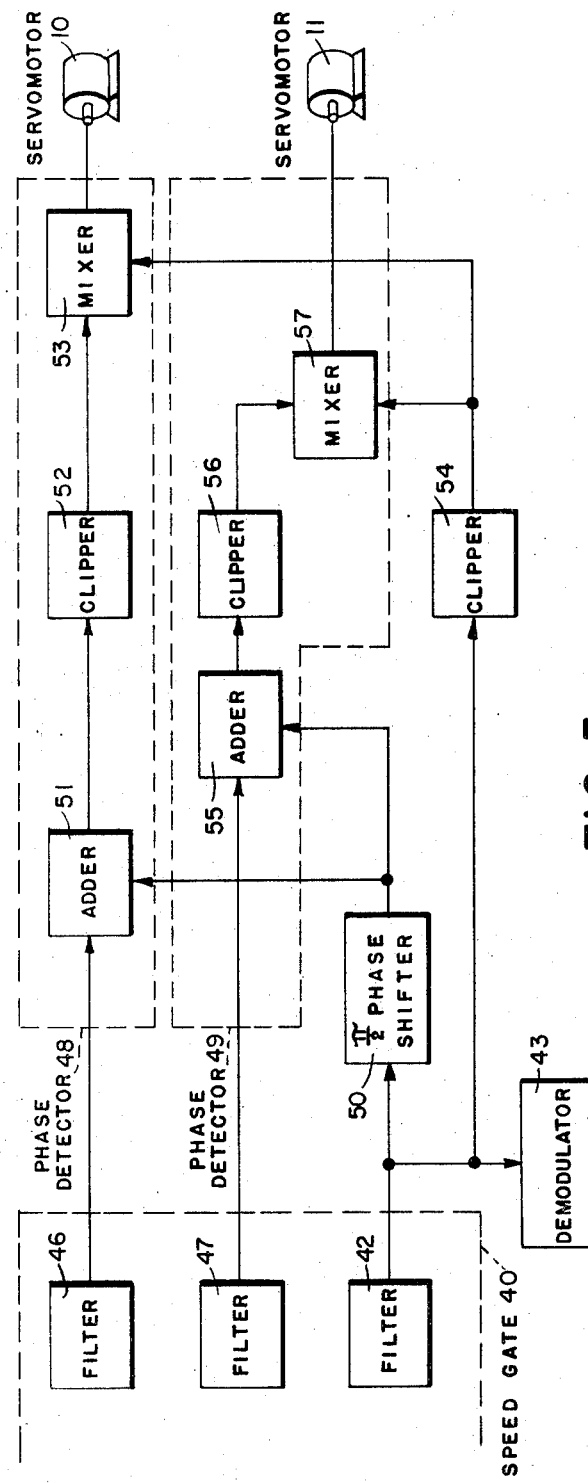
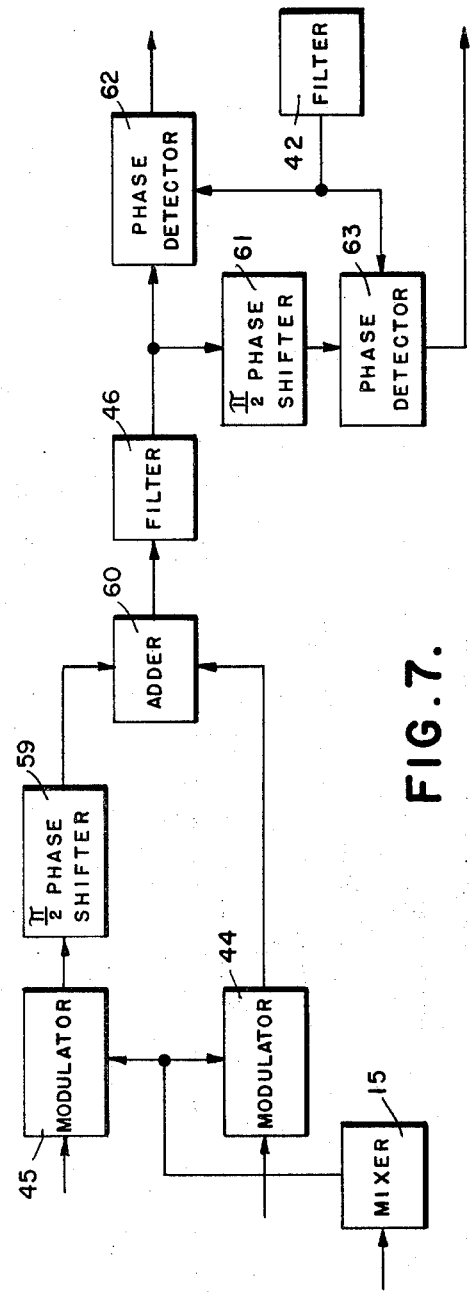
FIG. 5.
FIG. 7.
INVENTOR
Helmut Kummer
BY *George H Spencer*
ATTORNEY

SPEED GATE EQUIPPED DOPPLER RADAR SYSTEM

The present invention relates to a radar system.

More particularly, the present invention relates to an arrangement for increasing the immunity of a Doppler radar set used for position and target finding to noise, interference, jamming, and the like, especially an arrangement for avoiding the effect of multiple path reflections on the accuracy of the radar set. Multiple path reflections occur, for example, by ground reflection of the high frequency energy when the radar set is trained on low-flying targets so that the radiation pattern touches the ground.

In locating low-flying targets by means of a Doppler radar system, it is known to rely on a speed selection of the high frequency energy for utilizing only the direct exchange of energy between the radar set and the target being located. This speed selection is carried out by means of circuitry containing Doppler frequency filters, known as speed gates. Such filters generally have a band width of about 1,000 c.p.s.

In practice, however, it has been found that when Doppler radar sets are used to locate and track low-flying targets, i.e., when the radiation pattern touches ground, errors will result; the approximate equation representing the error being:

$$\Delta = h \ ( B \cdot \lambda)/(2 \cdot v) \qquad (1)$$

where $\Delta$ = error, in meters,
$h$ = altitude of the target above ground, in meters,
$B$ = band width of the speed gates, in cycles per second,
$\lambda$ = wave length at which the radar set operates, in meters,
$v$ = absolute speed of the target, in meters per second.

For example: if $B = 1,000$ c.p.s., $\lambda = 0.03$ m, and $v = 150$ m/sec, the error $\Delta$ incurred in determining the position of the target will be $0.1 \cdot h$ meters. An error of this magnitude cannot be dismissed as negligible, particularly in the case of radar-controlled instrument landings of aircraft under zero visibility conditions, as well as in the case of locating, tracking and engaging low-flying hostile aircraft and missiles.

The error $\Delta$ of equation (1) could be reduced in the radar set by decreasing the parameters B and $\lambda$; the other parameters $h$ and $v$, being dependent on the target, can obviously not be influenced by the design of the radar set. Thus, the band width B of the speed gate could be reduced by one order of magnitude, i.e., to about 100 c.p.s., without producing difficulties insofar as target echo fluctuations are concerned because, as experience has shown, for these conditions the speed gate need have a minimum band width of only about 50 to 100 c.p.s. In this way, errors due to multiple path reflection could, in the above example, be reduced to about 1 percent of the altitude of the target.

The difficulty with the above solution is that, in order to obtain good precision not only insofar as the distance but also the bearing of the target is concerned, a space scanning system has to be used, for example, a search antenna incorporating a rotating dipole. Theoretically, the scanning frequency necessary to obtain the desired flow of information can be small, i.e., of the order of magnitude of 1 c.p.s. In practice, however, the frequency canot, due to the above-mentioned unavoidable echo fluctuations, be within the fluctuation spectrum, so that the minimum scanning frequency will have to be several hundred c.p.s., e. g. in the above example, the scanning frequency will have to be about 300 c.p.s.

The side frequencies of the intelligence signal, which result from the scanning frequency modulation, have to be passed on by the speed gate without distortion. For this reason, the band width of the normal radar sets has to be about 1,000 c.p.s., which brings about the above-explained drawbacks, namely, a relatively high error $\Delta$.

Nor can the average wave length $\lambda$ be reduced, because this would reduce the maximum range of the radar set, as is well known in the art. Besides, if very short electromagnetic waves are used, the absorption properties of the atmosphere would have an adverse effect on the system.

It is, therefore, an object of the present invention to provide a radar system which overcomes the above disadvantages, namely, a system which, despite multiple path reflections, is very accurate and is immune to noise.

With the above basic object in view, the present invention resides in a Doppler radar system in which the intelligence signal containing the Doppler frequency is subjected to the action of a speed gate. This speed gate, in contradistinction to heretofore known arrangements, comprises a plurality of narrow band pass filters, preferably filters having their band centers at the same frequency, the number of such filters corresponding to the number of items of intelligence to be obtained, as for example, the elevation of the target, the distance of the target from the radar set, and the azimuthal bearing of the target. In the absence of echo fluctuations, the band width of the filters depends only on the information containing spectrum, for example, 1 c.p.s., of the intelligence signal appearing at the input of the speed gate, which spectrum is the one to be transmitted by the gate. Furthermore, means are provided ahead of the filters for changing the spectrum of the intelligence signal, by countermodulation, in such a manner that the carrier frequency energy is transformed into side frequencies, and that the energy of those side frequencies which contain the information is transformed to the place of the original carrier frequency.

The present invention further resides in the provision of an arrangement for transforming amplitude-modulated signals into phase-modulated signals, which arrangement is particularly well adapted for use with the radar system briefly described above.

Additional objects and advantages of the present invention will become apparent upon consideration of the following description when taken in conjunction with the accompanying drawings in which:

FIG. 5 is a block diagram showing the details of two of the components of the circuit of FIG. 4.

FIG. 7 is a block diagram of a part of the radar system according to the instant invention in which the filters in the speed gate are put to multiple use.

Figure 1:
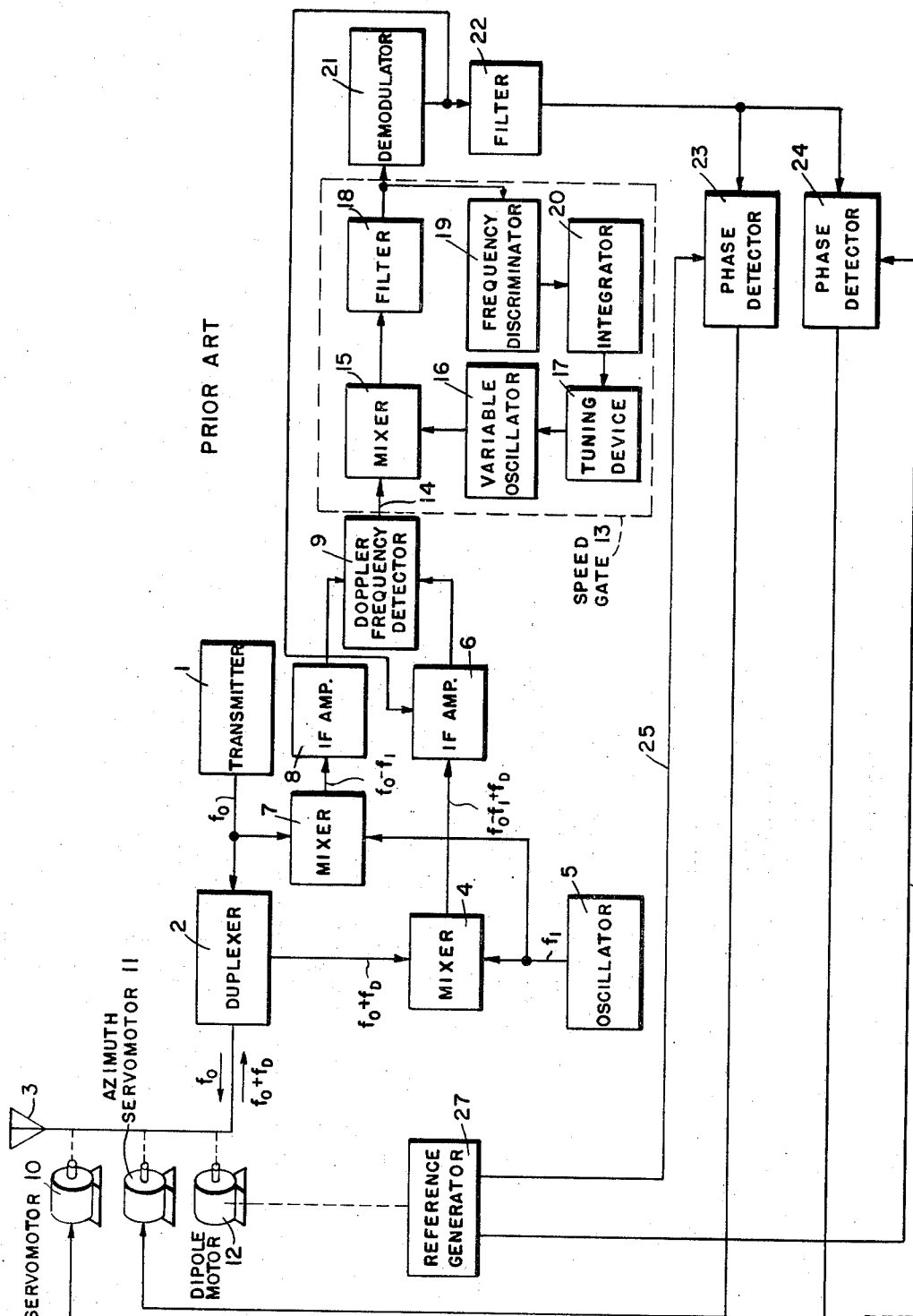
FIG. 1 is a block diagram of a conventional, prior art Doppler radar set.

Referring now to the drawings, FIG. 1 is a block diagram of a conventional radar set and shows a transmitter 1 which sends electromagnetic energy of a frequency $f_o$, via a duplexer 2 and a search antenna 3, toward a target. If the target moves in a radial direction relative to the radar set, i.e., in a direction of which at least a component is a direction toward or away from the set, the antenna 3 will receive an incoming signal having a frequency $f_o + f_D$, $f_D$ being the Doppler frequency by which the incoming signal will differ from the outgoing signal. The incoming signal is applied to the duplexer 2, from whence it is fed to one input of a mixer 4 whose other input is connected to an oscillator 5 which produces the frequency $f_1$. The mixer output $f_o - f_1 + f_D$ is applied to an intermediate frequency (IF) amplifier 6. The frequency $f_1$ produced by the oscillator 5 is also applied to a second mixer 7, where the frequency $f_1$ is mixed with the frequency $f_o$ of the transmitter 1. The output of the second mixer, namely, $f_o f_1$, is applied to a second IF amplifier 8, and the outputs of the two IF amplifiers 6 and 8 are applied to a Doppler frequency detector 9.

The antenna 3 is provided with servomotors 10 and 11 for adjusting the elevation and azimuth of the antenna, respectively, as well as with means for scanning the space, for example, a dipole (not shown) driven by a motor 12. As a result, not only the Doppler frequency will appear at the output of the Doppler frequency detector 9, but also the side frequencies of the scanning frequency, if the antenna is not pointed directly at the target. This signal is represented by the following equation:

$$E [1 + m \cos (\Omega t + \phi)] \cos 2\pi f_D t \quad (2)$$

where $E$ = field strength of the intelligence signal,
$m$ = degree of modulation corresponding to the deviation of the target with respect to the antenna axis,
$\Omega$ = scanning frequency,
$\phi$ = angle of the target position with respect to a reference system, and
$f_D$ = Doppler frequency.

The speed gate 13 contains the various components for carrying out the selection of the useful intelligence signal. These components include a third mixer 15 one of whose inputs is connected to the output of the Doppler frequency detector 9 via a lead 14. The other input of mixer 15 is connected to the output of a variable oscillator 16 which, by means of a tuning device 17, is continuously and automatically adjusted to deliver such a frequency that the mixer 15 will apply to a filter 18 a signal having a carrier frequency which corresponds to the pass frequency $\omega_o$ of the filter 18.

As a result of this automatic adjustment, the intelligence signal is brought into the following form:

$$E [1 + m \cos (\Omega t + \phi)] \cos \omega_o t \quad (3)$$

The side bands, caused by the scanning frequency, for example, the frequency of rotation of the antenna dipole which is about 300 c.p.s., are satisfactorily passed by the filter 18. The output of the filter 18 is used to adjust the tuning device 17; this is accomplished via a frequency discriminator 19 whose input is connected to the output of the filter 18, and an integrator 20 whose input is connected to the output of the discriminator 19 and whose output is connected to the input of the tuning device 17. The output of the filter 18 is also connected to the input of a demodulator 21 for the scanning frequency. The output of the demodulator 21 is connected, via a second filter 22, to one of the two inputs of each of two phase detectors 23 and 24. The pass frequency of the filter 22 is equal to the scanning frequency $\Omega$. The other inputs of the phase detectors 23 and 24 have the normalized reference signals $\sin \Omega t$ and $\cos \Omega t$, applied to them via leads 25 and 26, respectively, connected to a reference generator 27 mechanically coupled to the motor 12, so that the outputs of the phase detectors will be the difference values $x$ and $y$, in the Cartesian coordinate system. With E being field strength, $x = E/2$ m $\cos \phi$ and $y = E/2$ m $\sin \phi$.

The difference or deviation values taken from the phase detectors 23 and 24 are used for controlling the servomotors 10 and 11. In order to obtain the actual deviation of the target, the field strength E must first be eliminated from the output of the phase detectors. This elimination is obtained by controlling the amplification of the IF amplifier 6 in response to the output of the demodulator 21.

Figure 2:
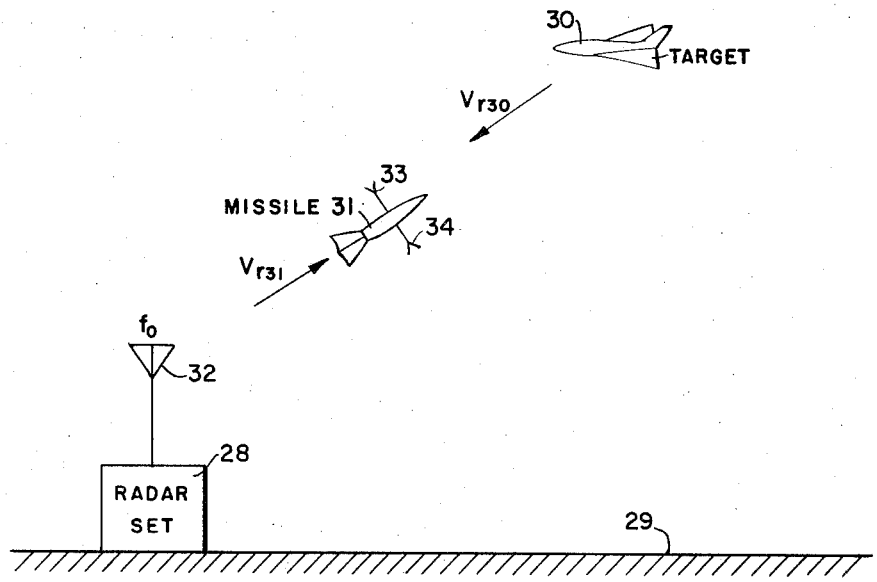
FIG. 2 shows how the radar set can be used to guide a missile for intercepting a hostile target.

FIG. 2 is an elevational illustration showing the spatial relation between the radar set 28, for example, the set described in conjunction with FIG. 1, ground 29, a flying target 30, and a missile 31 between the target and the set and controlled by the latter. The antenna 32 radiates energy at a frequency $f_o$ toward the target 30 which, if a component of the velocity of the target is a radial vector, i.e., a vector toward or away from the radar set, will reflect a part of the energy emitted by the antenna; according to the Doppler principle, the energy received by the antenna will have a frequency that is shifted from the original frequency $f_o$ by the Doppler frequency $f_{D2}$. The arrow next to the target 30 shows the radial vector $v_{r30}$. The frequency $f_{D2}$ will be $$f_{D2} = (2 v_{r30})/\lambda$$

The receiving antenna 33 of the missile 31 picks up the frequency $f_o + f_{D2} + f_{D1}$, where $$f_{D1} = (v_{r31})/\lambda$$

with $f_{D1}$ being the Doppler frequency resulting from the radial component $v_{r31}$, away from the radar set 28, of the missile velocity. At the same time, the second antenna 34 of the missile receives the frequency $f_o - f_{D1}$.

Figure 3:
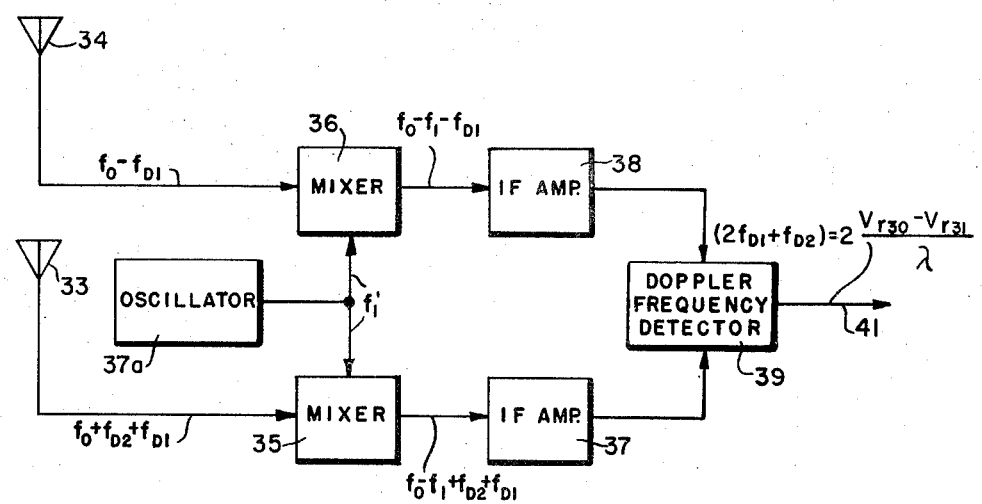
FIG. 3 shows part of a radar system within the missile of FIG. 2.

FIG. 3 shows the circuitry of a component carried by the missile and pertaining to its radar system. This missile-borne component comprises the above-mentioned antennas 33 and 34 which are connected to one of the two inputs of mixers 35 and 36, respectively, the other inputs of the mixers being connected to an oscillator 37a which corresponds to oscillator 5 of FIG. 1 and generates the frequency $f_1' = f_1$. Thus, the outputs of the mixers 35 and 36 are $f_o - f_1' + f_{D2} + f_{D1}$ and $f_o - f_1' - f_{D1}$, respectively; these outputs are applied to IF amplifiers 37 and 38, corresponding to amplifiers 6 and 8 of FIG. 1, and the thus-amplified values are applied to a Doppler frequency detector 39, whose output will be $(2 f_{D1} + f_{D2}) = 2 (v_{r30} - v_{r31})/\lambda$. This frequency is then processed further, in the manner shown in FIG. 1.

Figures 4, 6:
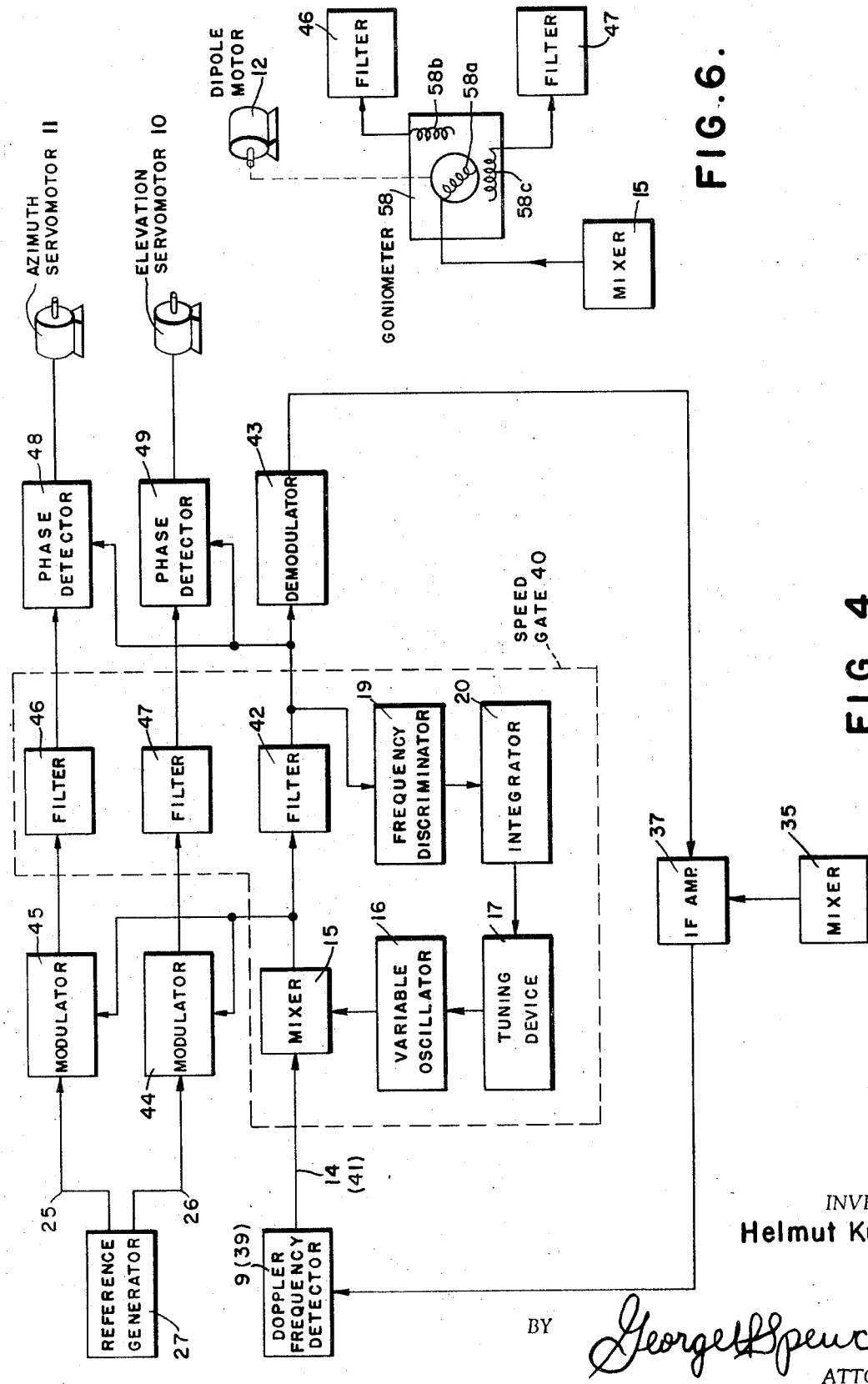
FIG. 4 is a block diagram of a speed gate according to the present invention, the speed gate being adapted for use with the radar circuit shown in FIG. 1 or the circuit shown in FIG. 3.
FIG. 6 is a schematic block diagram showing the use of a goniometer-type control for use with the antenna of the radar set of FIG. 1.

FIG. 4 shows an arrangement according to the present invention in which the speed gate, now indicated at 40, is built with a band pass filter 42 having a pass band not of 1,000 c.p.s., but of 100 c.p.s. As before, the incoming signal from the Doppler frequency detector 9 (or 39) is applied, via a line 14 (or 41), to one input of the mixer 15 whose other input is connected to the variable oscillator 16 which, in turn, is automatically controlled by the output of the filter 42, via the tuning device 17, the frequency discriminator 19 and the integrator 20, such that the average frequency of the output frequencies of mixer 15 is within the pass band of the filter 42. Inasmuch as the side frequencies of the intelligence signal applied to the filter 42 is outside of the pass band of this filter, the output of the filter will produce a signal having the form $$E \cos \omega_0 t \quad (4)$$

This signal is applied to the demodulator 43 whose output controls the IF amplifier 37. The output of the mixer 15 is also connected to one of the two inputs of each of two modulators 44 and 45, whose other inputs are connected to the reference signals $\cos \Omega t$ and $\sin \Omega t$, respectively.

The signal modulated with the reference signal $\cos \Omega t$ $$E [1 + m \cos (\Omega t + \phi)] \cos \omega_0 t \cdot \cos \Omega t \quad (5)$$

produces $$E/2 \cos (\omega_0 + \Omega) t + E/2 \cos (\omega_0 - \Omega) t$$
$$+ E/2 \, m \cos \phi \cos \omega_0 t + E/2 \, m \cos (\omega_0 t + 2 \Omega t + \phi) \quad (6)$$

The output of the filter 46 connected to the modulator 45 will thus be $$E/2 \, m \cos \phi \cos \omega_0 t \quad (7)$$

The amplitude of this output signal is a measure giving the difference of the position of the target searching antenna in a first reference plane.

By modulating the output of the mixer 15 with the reference signal $\sin \Omega t$ in modulator 44, the output of filter 47 gives the difference of the position of the target searching antenna in a second reference plane at right angles to the first, namely, $$E/2 \, m \sin \phi \cos \omega_0 t \quad (8)$$

In order to obtain the actual difference position from the signals defined by equations (7) and (8), the field strength E has to be eliminated. This is accomplished by the automatic level control described above; in practice, however, serious difficulties are encountered caused, for example, by the fluctuation spectrum of the echo signals. The signals according to equations (4) and (7), or (4) and (8), as the case may be, are processed in a manner in which, instead of measuring the amplitude, it is the phase which is measured, as shown schematically by the phase detectors 48 and 49.

FIG. 5 shows the details of the phase detectors 48 and 49. The circuit includes a fixedly adjusted $\pi/2$ phase shifter 50 so that the signal $E \cdot \cos \omega_0 t$ will appear, at the output of the phase shifter, as $E \cdot \cos \omega_0 t + \pi/2$. This value is added, in an adder 51, with the modulated output signal $E/2 \, m \cos \phi \cos \omega_0 t$ coming from the filter 46. The output of the adder 51 is applied to a clipper 52 which limits the amplitude of the signal. The output of the clipper 52 is applied to one of the inputs of a mixer 53 whose other input is connected to the output of another clipper 54 which limits the amplitude of the unmodulated signal coming from the filter 42. The output of the mixer 53 will be $$m \cdot \cos \phi \quad (9)$$

which is used to control the servomotor 10.

Similarly, the modulated output of filter 47, namely, $E/2 \, m \sin \phi \cdot \cos \omega_0 t$, is combined with the output of the phase shifter 50 in a further adder 55, whose output is applied, via a clipper 56, to one input of a further mixer 57, the other input of the mixer 57 being connected to the unmodulated output of clipper 54 so that the servomotor is controlled by the output of mixer 57, which is a signal represented by $$m \cdot \sin \phi \quad (10)$$

The signals appearing at the outputs of the mixers 53 and 57, which correspond to the deviation of the target, are thus independent of the field strength.

The modulators 44 and 45 must meet very high requirements insofar as their linearity as well their ability to retain a constant zero point are concerned. If the modulators are electronic circuits incorporating diodes having curved characteristics, it is very expensive to fulfill these requirements, assuming that it is possible in the first place. Therefore, the arrangement according to the present invention includes as a further feature, an electromechanical modulator which takes the places of the electronic modulators 44 and 45. This electromechanical modulator, which can be used in place of the reference generator 27, is mechanically coupled directly to the shaft of the motor 12 and contains the modulators 44 and 45 of FIG. 4. As shown in FIG. 6, the modulator can be in the form of a goniometer 58; the rotating coil 58a of the goniometer is mechanically connected to the motor 12 and electrically connected to the output of mixer 15, and the two stationary coils 58b and 58c, while displaced relative to each other by $\pi/2$, are electrically connected to the inputs of the filters 46 and 47, respectively.

The filters 42, 46, and 47 of FIG. 4 can be mechanical filters, for example, mechanical filters having a midband frequency of 150 kilocycles and a band width of 100 c.p.s.

If desired, the filters in the speed gate can each be used for two intelligence signals, as shown in FIG. 7. Here, the output of the modulator 45 is connected to a $\pi/2$ phase shifter 59 whose output is added to that of the modulator 44 in an adder 60. The output of the adder 60 is applied to the filter 46, whose output is applied directly to one input of a first phase detector 62 and, via another $\pi/2$ phase shifter 61, to one input of a second phase detector 63. the other inputs of the two phase detectors 62 and 63 are connected to the output of the filter 42. The outputs of the phase detectors 62 and 63, which correspond to the output signals of the phase detectors 48 and 49, are used to control the servomotors of the search antennas.

It will be understood that the above description of the present invention is susceptible to various modifications, changes, and adaptations, and the same are intended to be comprehended within the meaning and range of equivalents of the appended claims.

What is claimed is:

1. In a Doppler radar system, the combination which comprises:
   a. intelligence responsive means;
   b. reference generator means coupled to said intelligence responsive means;
   c. signal processing means electrically connected, to said intelligence responsive means and including
      1. a Doppler frequency detector, and
      2. a speed gate incorporating
         i. a mixer receiving the output of said Doppler frequency detector and being controlled to deliver a substantially constant carrier frequency, and
         ii. a plurality of band pass filters each having a narrow pass band;
   d. modulating means connected to the output of said reference generator means and to the output of said mixer, the output of said modulating means being connected to at least one of said filters of said speed gate; and
   e. means connecting the output of at least said last-mentioned filter to said intelligence responsive means for controlling the same.

2. In a Doppler radar system, the combination which comprises:
   a. search antenna means;
   b. reference generator means coupled to said search antenna means;
   c. signal processing means electrically connected to said search antenna means and including
      1. a Doppler frequency detector, and
      2. a speed gate incorporating,
         i. a two-input mixer one of whose inputs is connected to the output of said Doppler frequency detector,
         ii. at least first and second band pass filters each having a narrow pass band, the input of said first filter being connected to the output of said mixer, and
         iii. mixer control means connected to the output of said first filter and to the other of the inputs of said mixer for causing the latter to deliver a substantially constant carrier frequency;
   d. modulating means connected to the output of said reference generator means and to the output of said mixer, the output of said modulating means being connected to the input of said second filter of said speed gate; and
   e. means connecting the output of said second filter to said search antenna means for controlling the position thereof.

3. The combination defined in claim 2 wherein the output of said first filter is connected for controlling said Doppler frequency detector.

4. The combination defined in claim 2 wherein said connecting means comprise a component to which the outputs of said respective filters are connected, and means connected to said component for deriving therefrom a plurality of outputs for controlling the position of said search antenna means.

5. The combination defined in claim 2 wherein said second filter connected to said modulating means controls but one variable affecting the position of said search antenna means.

6. The combination defined in claim 2 wherein said modulating means effect amplitude modulation, and wherein said connecting means comprise phase detecting means.

7. The combination defined in claim 6 wherein said search antenna means comprise at least one servomotor and wherein said phase detecting means comprise:
   a. a phase-shifter whose input is connected to the output of said first filter;
   b. a two-input adder one of whose inputs is connected to the output of said second filter and the other of whose inputs is connected to the output of said phase-shifter;
   c. a first clipper whose input is connected to the output of said adder;
   d. a second clipper whose input is connected to the output of said first filter; and
   e. a two-input mixer one of whose inputs is connected to the output of said first clipper and the other of whose inputs is connected to the output of said second clipper, the output of said last-mentioned mixer being connected to said servomotor of said search antenna means.

8. The combination defined in claim 2 wherein said modulating means comprise:
   a. two modulators each connected to the output of said mixer, one of said modulators being further connected to one intelligence signal coming from said reference generator means and the other of said modulators being further connected to another intelligence signal coming from said reference generator means;
   b. a phase shifter whose input is connected to the output of said one modulator; and
   c. a two-input adder one of whose inputs is connected to the output of said first phase shifter and whose other input is connected to the output of said other modulator, the output of said adder constituting the output of said modulating means and being connected to the input of said second filter.

9. The combination defined in claim 8 wherein said search antenna means comprise at least two servomotors and wherein said connecting means comprise:
   a. a first two-input phase detector one of whose inputs is connected to the output of said second filter;
   b. a phase-shifter whose input is connected to the output of said second filter; and
   c. a second two-input phase detector one of whose inputs is connected to the output of said last-mentioned phase shifter;
the remaining inputs of each of said phase detectors being connected to the output of said first filter, and the outputs of said two phase detectors constituting the output of said connecting means and being connected, respectively, to said servomotors of said search antenna means.

10. In a Doppler radar system, the combination which comprises:

a. search antenna means;
b. reference generator means coupled to said search antenna means;
c. signal processing means electrically connected to said search antenna means and including
   1. a Doppler frequency detector, and
   2. a speed gate incorporating
      i. a two-input mixer one of whose inputs is connected to the output of said Doppler frequency detector,
      ii. at least first, second, and third band pass filters each having a narrow pass band, said first filter being connected to the output of said mixer, and
      iii. mixer control means connected to the output of said first filter and to the other of the inputs of said mixer for causing the latter to deliver a substantially constant frequency;
d. modulating means connected to the output of said reference generator means and to the output of said mixer, the output of said modulating means being connected to the inputs of said second and third filters of said speed gate; and
e. means connecting the outputs of said second and third filters to said search antenna means for controlling the position thereof.

11. The combination defined in claim 10 wherein said connecting means comprise:
   a. a phase-shifter connected to the output of said first filter;
   b. a first clipper whose input is connected to the output of said first filter; and
   c. two phase detectors connected to said second and third filters, respectively, each phase detector comprising a two-input adder, a clipper whose input is connected to the output of the adder, and a two-input mixer one of whose inputs is connected to the output of the clipper, one input of the adder being connected to the output of the respective filter and the other input of the adder being connected to the output of said phase-shifter, the other input of the mixer being connected to the output of said first clipper, and the output if each respective mixer being connected to a respective servomotor controlling the position of said search antenna means.

12. The combination defined in claim 10 wherein said modulating means comprise a goniometer having a moving coil and two stationary coils which are angularly displaced relative to each other, said moving coil being mechanically connected to said search antenna means and electrically connected to the output of said mixer, and said stationary coils being connected to the inputs of said second and third filters, respectively.

* * * * *